United States Patent
Lin et al.

(10) Patent No.: US 10,938,882 B2
(45) Date of Patent: Mar. 2, 2021

(54) PREPROCESSING AND STORAGE OF CLOUD SERVICE USAGE REPORTS

(71) Applicant: ServiceNow, Inc., Santa Clara, CA (US)

(72) Inventors: Chowie Chunyan Lin, San Jose, CA (US); Chanwook Kim, San Jose, CA (US); Shravan Kalsanka Pai, Milpitas, CA (US); Vani Banaji, Saratoga, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/506,305

(22) Filed: Jul. 9, 2019

(65) Prior Publication Data

US 2021/0014299 A1 Jan. 14, 2021

(51) Int. Cl.
| | | |
|---|---|---|
| *H04L 12/40* | (2006.01) | |
| *H04L 29/06* | (2006.01) | |
| *H04L 29/08* | (2006.01) | |
| *H04L 12/24* | (2006.01) | |
| *H04L 12/927* | (2013.01) | |
| *H04L 12/26* | (2006.01) | |
| *H04L 12/14* | (2006.01) | |

(52) U.S. Cl.
CPC ........ *H04L 67/025* (2013.01); *H04L 12/1439* (2013.01); *H04L 67/06* (2013.01); *H04L 67/20* (2013.01); *H04L 67/2871* (2013.01)

(58) Field of Classification Search
CPC ... H04L 67/025; H04L 12/1439; H04L 67/06; H04L 67/20; H04L 67/2871
See application file for complete search history.

(56) References Cited

U.S. PATENT DOCUMENTS

| | | | |
|---|---|---|---|
| 9,760,928 B1 * | 9/2017 | Ward, Jr. ........... | G06Q 30/0613 |
| 2002/0128984 A1 * | 9/2002 | Mehta .................. | H04M 15/68 705/71 |
| 2006/0178918 A1 * | 8/2006 | Mikurak .......... | G06Q 10/06375 705/7.25 |
| 2014/0207918 A1 * | 7/2014 | Kowalski ............ | G06F 11/0709 709/220 |

(Continued)

*Primary Examiner* — Christopher B Robinson
(74) *Attorney, Agent, or Firm* — Fletcher Yoder, P.C.

(57) ABSTRACT

Systems and methods for streaming billing data associated with third-party network resources consumed by a managed network to a remote network management platform are disclosed. Streaming of billing usage data associated with third-party resources may use resource identifiers to associate resources with line items in a service bill generated by the third-party network. A proxy server in the managed network may intermediate streaming from the third-party network to a remote server in a computational instance of the remote network management platform. Billing data may be recorded partly in a metric-base database configured for storing time series data corresponding to usage quantities of third-party resources consumed by the managed network per unit time, and partly in a static records database configured for storing database records associated with the time series data, and including data for identifying the third-party resources and for recording static information relating to billing for the third-party resources.

17 Claims, 14 Drawing Sheets

(56) References Cited

U.S. PATENT DOCUMENTS

2015/0134626 A1\* 5/2015 Theimer ............. G06F 11/3055
707/693
2018/0075054 A1\* 3/2018 Nuss ..................... G06F 16/122
2020/0042627 A1\* 2/2020 Siebel ................... G06F 16/258

\* cited by examiner

PREPROCESSING AND STORAGE OF CLOUD SERVICE USAGE REPORTS

BACKGROUND

Managed networks may support the missions and operations of organizations or enterprises, and may include various types of computer networks that can be remotely administered. Management may involve one or more computing devices disposed within a remote network management platform collecting information about the configuration and operational states of software applications executing on behalf on the managed network, and then presenting representations of this information by way of one or more user interfaces. The user interfaces may be, for instance, web-based user interfaces. In some instances, remote management of networks may be provided by an entity separate from that of the managed network, such as a service provider or vendor.

In addition to engaging a service provider or vendor for remote network management services, an enterprise may also use a third-party network, sometimes referred to as a cloud or datacenter, to deploy various applications and services for the enterprise's employees, clients, and customers. For instance, the enterprise may use on-demand computational resources from the third-party network, or the enterprise may reserve the right to use the computing resources in advance by way of a reserved instance (RI). On-demand computing resources offer the flexibility to increase or decrease in scale so that these resources match fluctuating needs of the enterprise, and often involve a pay-per-use model. On the other hand, computing resources purchased via a reserved instance often involve an agreement for computational resources across a specified term (e.g., 1 or 3 years) for particular payment (e.g., an upfront payment or a payment plan). For these or other models of third-party computational resource usage, the third-party network owner and/or operator will bill the enterprise on some basis for resources consumed.

SUMMARY

In accordance with example embodiments, remote network management of a managed network may be implemented by a "computational instance" or "customer instance" of a remote network management platform. A computational instance may include various physical and/or virtual servers, databases, and other computing resources that may be dedicated or assigned to managing a network of an organization or enterprise. A computational instance may also include various ready-made network management tasks and services, as well as facilities for customizing tasks and services, for example. The remote management platform may be owned and/or operated by a service provider, which may provide computational instances to organizations or enterprises on a subscription basis, for example. In some deployments, an organization or enterprise may have more than one computational instance.

As noted, an enterprise or organization may, in addition to obtaining network management services from a remote network management platform owner or service provider, also obtain other types of network and/or computing resources from a third-party provider. Such resources may include computing/processing resources of virtual machines, cloud storage, and data center services, among others. For purposes of discussion herein, the term "third-party network" will be used to refer to both a third-party provider of these types of services, as well as the infrastructure operated by the third-party provider to make the services available to customers. An example of a third-party network is Amazon Web Services™ (AWS™). Other third-party network providers may be available as well.

A third-party network will typically track usage of resources consumed by a customer, such as an enterprise, and issue a bill on some timeline for the usage. For example, the customer may have an account with the third-party network provider and be billed for third-party resources consumed on a monthly basis, corresponding to a billing cycle. The bill will generally be separate from any billing or charges by a remote network management platform service provider, as it will reflect a different set of services delivered to the enterprise. In a common arrangement, an enterprise may subscribe to a set of specific third-party network resources (e.g., virtual machine computing cycles, cloud storage, etc.), and the third-party network provider may meter usage of the specific resources during incremental time intervals within a billing cycle, and generate a bill for cumulative usage of each of the specific resources at some time after the end of each billing cycle. For instance, usage for a time-based resource, such as computing cycles, might be metered hourly as a fraction of each hour over which computing cycles were consumed by the enterprise. Each day of a billing cycle may thus be tracked according to 24 hourly rates of usage. Similar metering and tracking could be applied to cloud storage or other third-party computing resources. Other forms of metering and tracking could be used as well.

In practice, usage billing for third-party resources consumed by an enterprise can be complicated. For example, an enterprise may have a number of sub-organizations, such as departments, geographic regions, and/or administrative divisions, some or all of which may utilize third-party resources under separate tracking and metering arrangements. Thus, the total bill associated with an enterprise's account might be broken down not only according to specific resources, but according an enterprises organizational structure. Additionally, hourly (or other incremental interval) metering and tracking may yield expansive ranges and volumes of billing data. In particular, time-based metering and tracking may dictate, at least in part, how billing data are recorded and how they may be made available to the enterprise customer.

It may be common for a third-party network to provide usage billing for an account in a relatively compact form, such as monthly (or other billing cycle) totals for specific resources, or even summarized for resource categories. On the other hand, an enterprise may have an interest in careful scrutiny of billing usage data, not only for verification purposes, but to help identify and understand resource consumption trends in order to help ensure efficient usage and find areas improvement can be made. While detailed billing data may be available from the third-party network provider, the volume and format of the data may make it inconvenient or difficult for an enterprise customer to obtain, much less to process or examine.

The inventors have recognized that the remote network management platform, including one or more customer instances assigned to or associated with an enterprise's managed network, may support services and operations, and may already deploy infrastructure, both for providing efficient and intelligent acquisition and storage of detailed third-party resource-usage billing data for the enterprise, as well as for processing and analysis of detailed billing data. By obtaining the detailed data and storing it in a format that is convenient for processing and analysis, the remote network management platform may thus also support tools and functions that enable the enterprise to manage its utilization of third-party computing resources effectively.

Example embodiments herein are directed at systems and methods for advantageously achieving these valuable capabilities. In particular, by coordinating communications and operations between entities in a managed network and servers in a computational instance associated with the managed network, voluminous detailed billing usage data may be efficiently streamed from a third-party network to specially designed databases in the remote network management platform, where the data may be recorded in formats well-suited for both storage and analysis.

Accordingly, a first example embodiment may involve a system for streaming billing data to a remote network management platform from a third-party network, wherein the billing data are associated with usage of resources provided by the third-party network to a managed network that is associated with a computational instance of the remote network management platform, the system comprising: a metric-base database (MBDB) disposed within the remote network management platform and configured for storing time series data, wherein the time series data comprise data specifying usage quantities of third-party resources consumed by the managed network per unit time over specified time intervals; a static records database (SRDB) disposed within the remote network management platform and configured for storing database records that are associated with the time series data and include data for identifying the third-party resources and for recording static information relating to billing for the third-party resources; and one or more server devices configured to: determine a resource identifier associating a particular third-party resource with a particular line item in a service bill generated by the third-party network for third-party resources consumed by the managed network; based on the resource identifier, carry out download-streaming of billing usage data associated with the particular third-party resource from the third-party network to the one or more server devices; store the download-streamed billing usage data in a time-series file associated with the particular third-party resource in the MBDB; and if the SRDB does not already contain a static record associated with the particular third-party resource, create and store in the SRDB a particular static record that includes a link to the time-series file for the particular third-party resource.

In a second example embodiment may involve a proxy server for streaming billing data to a remote network management platform from a third-party network, wherein the billing data are associated with usage of resources provided by the third-party network to a managed network that is associated with a computational instance of the remote network management platform, and wherein the proxy server is disposed within the managed network and comprises: a communicative connection to the third-party network; a communicative connection to a remote server disposed within the computational instance; one or more processors; and memory storing instructions that, when executed by the one or more processors, cause the proxy server to carry out operations including: downloading, from the third-party network, a service bill for third-party resources consumed by the managed network; determining one or more resource identifiers each associating a respective third-party resource with a respective line item in the service bill; based on the one or more resource identifiers, intermediating download-streaming of billing usage data associated with each respective third-party resource from the third-party network to a metric-base database (MBDB) for storage in a respective time-series file, wherein the MBDB is disposed within the remote network management platform and the download-streaming is by way of the remote server, and wherein each respective time-series file comprises respective time series data specifying usage quantities of the respective third-party resource consumed by the managed network per unit time over a respectively specified time interval; and based on at least the one or more resource identifiers, providing the remote server with information for creating and storing respective static records in a static records database (SRDB) disposed within the remote network management platform, wherein the respective static records are associated with the respective time series data and each includes a respective link to the respective time-series file, and each further includes respective data for identifying the respective third-party resource and for recording respective static information relating to billing for the respective third-party resource.

In a third example embodiment may involve a method for streaming billing data to a remote network management platform from a third-party network, wherein the billing data are associated with usage of resources provided by the third-party network to a managed network that is associated with a computational instance of the remote network management platform, wherein the remote network management platform comprises (i) a metric-base database (MBDB) configured for storing time series data, wherein the time series data comprise data specifying usage quantities of third-party resources consumed by the managed network per unit time over specified time intervals, and (ii) a static records database (SRDB) configured for storing database records that are associated with the time series data and include data for identifying the third-party resources and for recording static information relating to billing for the third-party resources, and wherein the method comprises: determining a resource identifier associating a particular third-party resource with a particular line item in a service bill generated by the third-party network for third-party resources consumed by the managed network; based on the resource identifier, carrying out download-streaming of billing usage data associated with the particular third-party resource from the third-party network to the one or more server devices; storing the download-streamed billing usage data in a time-series file associated with the particular third-party resource in the MBDB; and if the SRDB does not already contain a static record associated with the particular third-party resource, creating and storing in the SRDB a particular static record that includes a link to the time-series file for the particular third-party resource.

In a fourth example embodiment, a system may include various means for carrying out each of the operations of the third example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
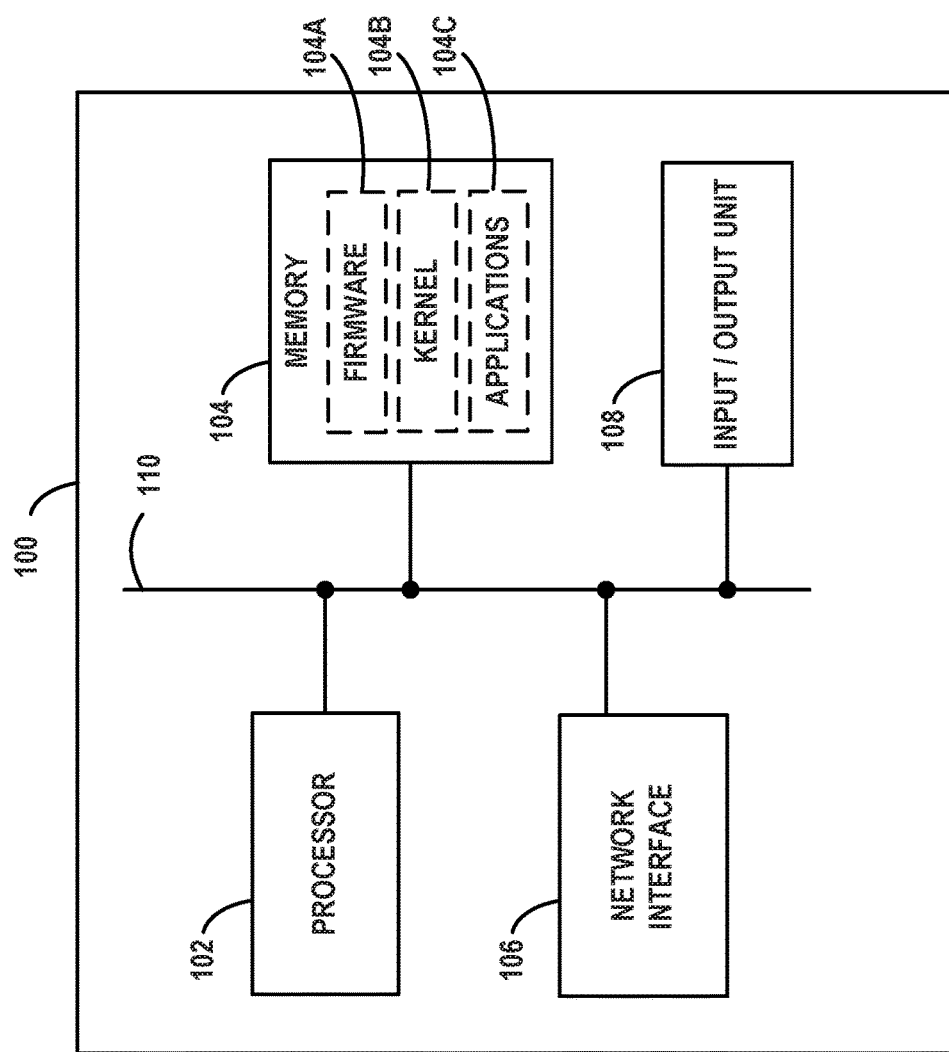
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
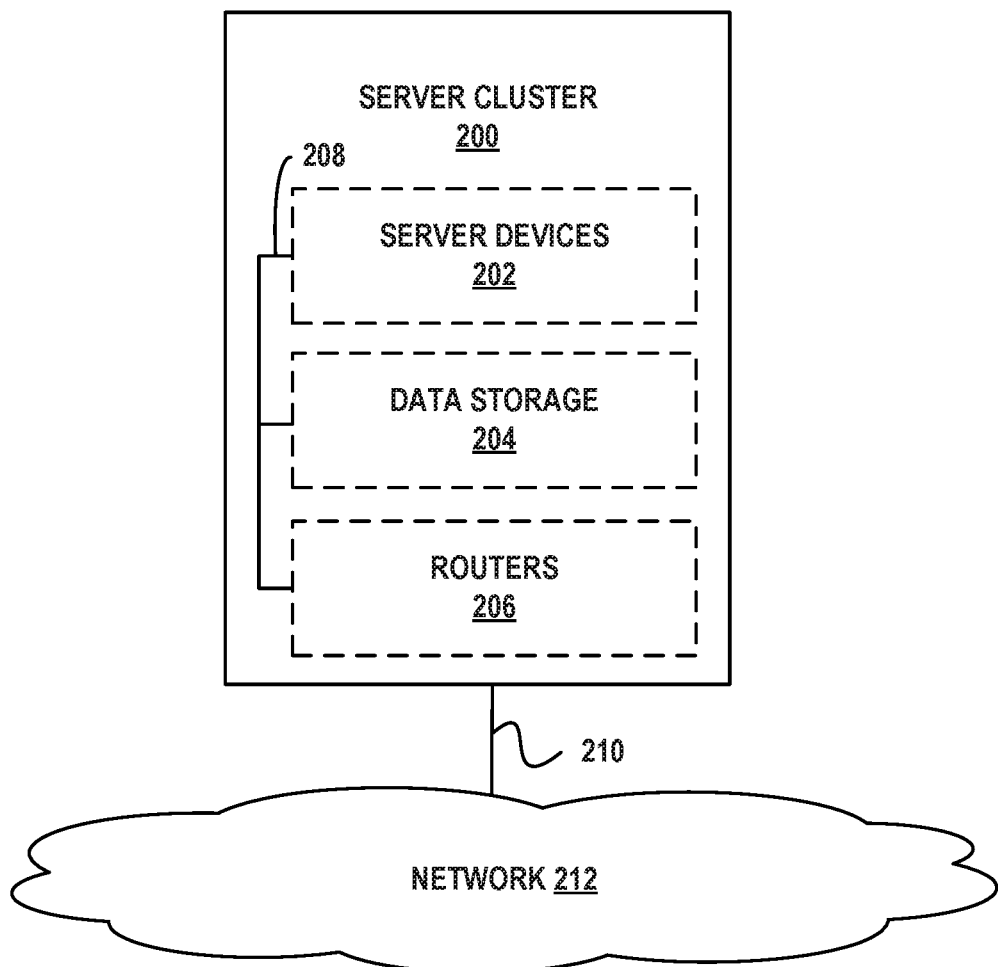
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
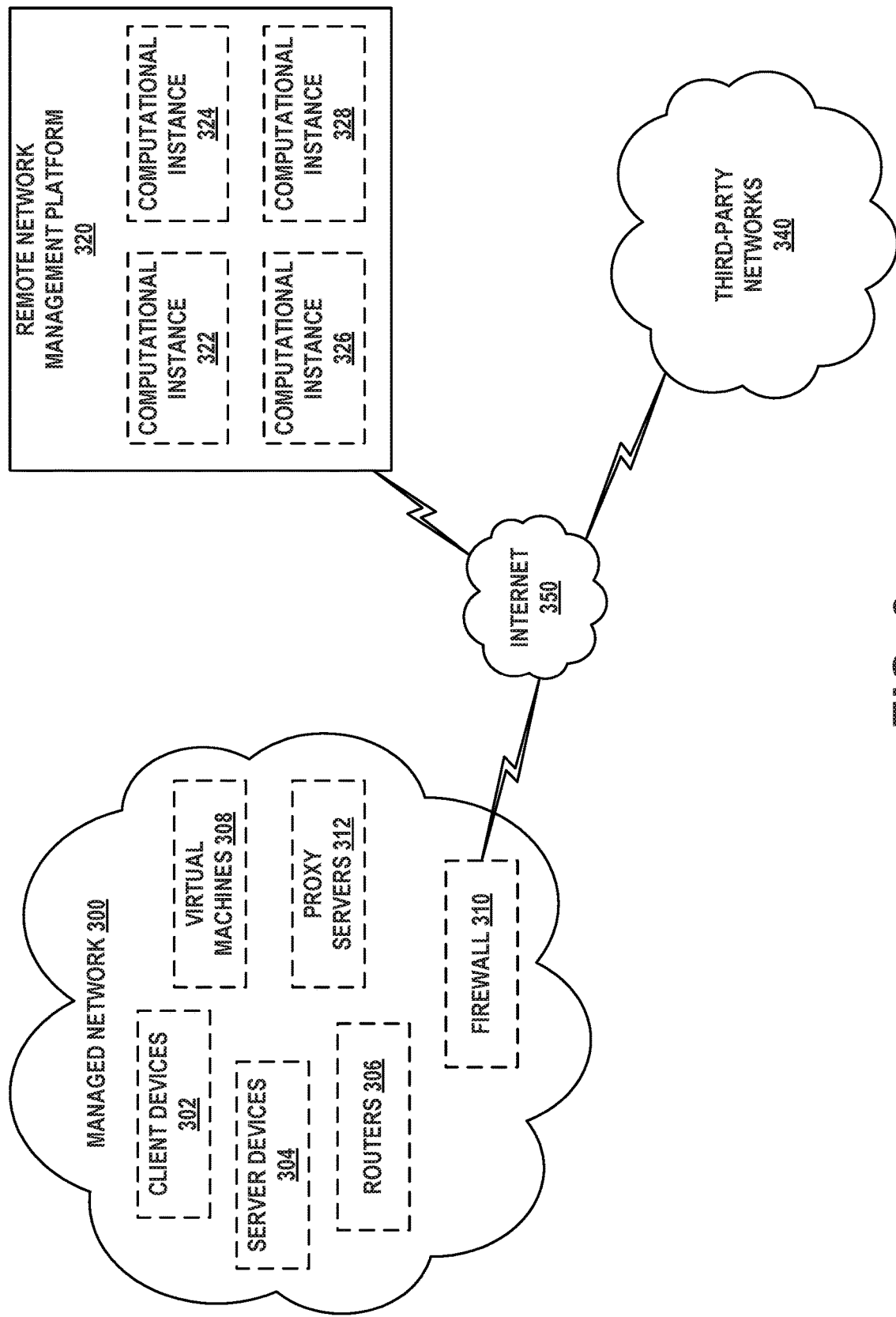
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion.

Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
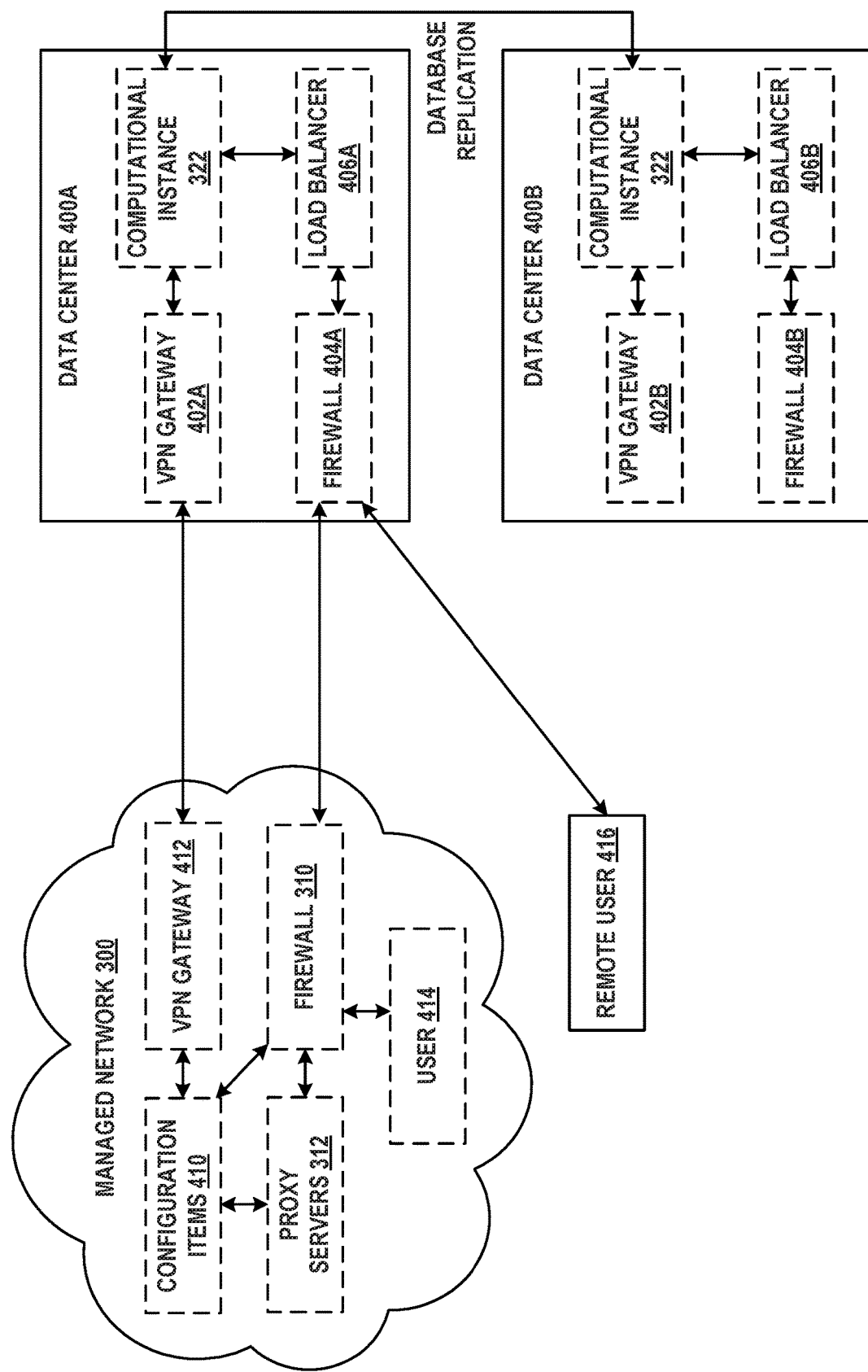
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
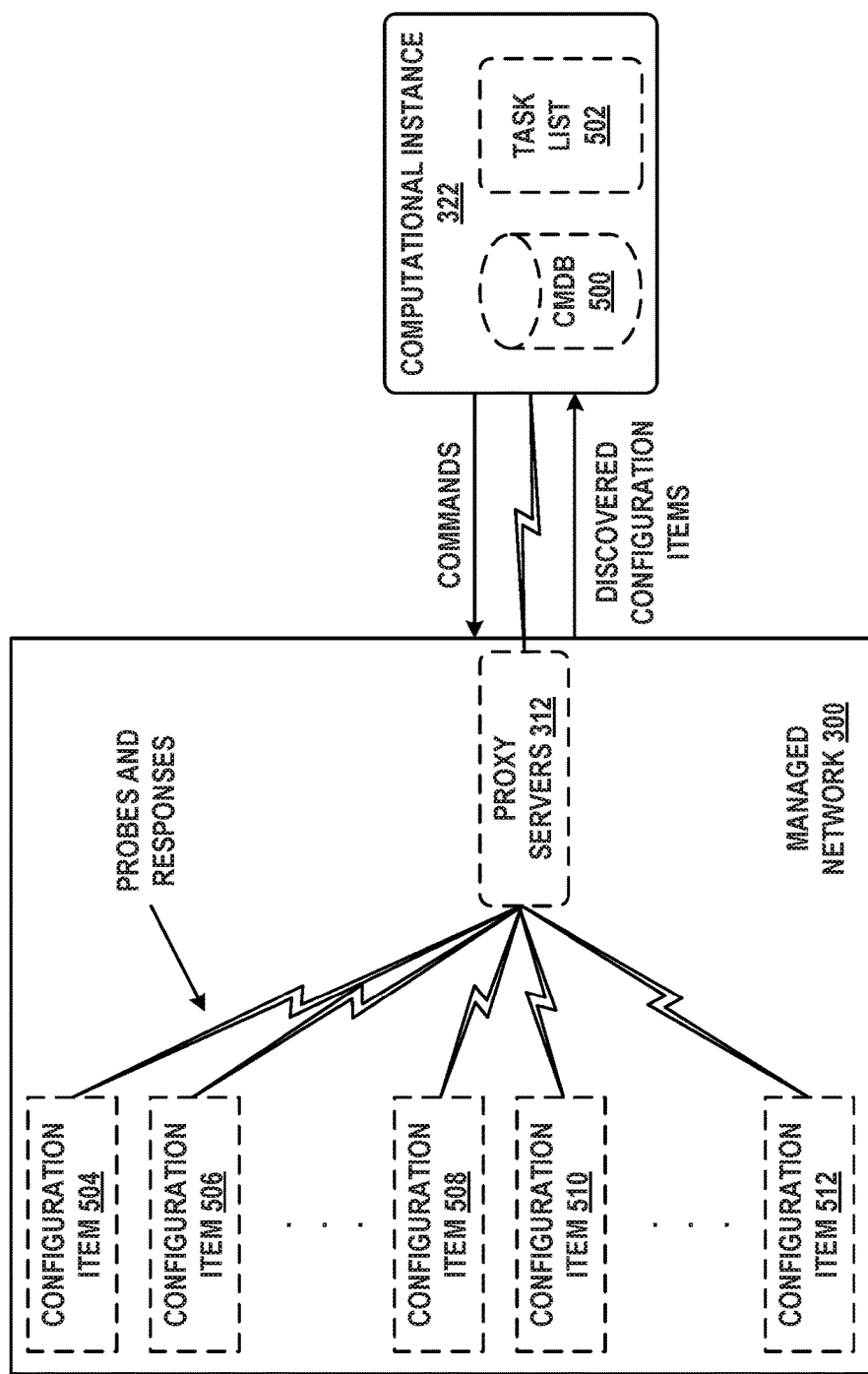
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
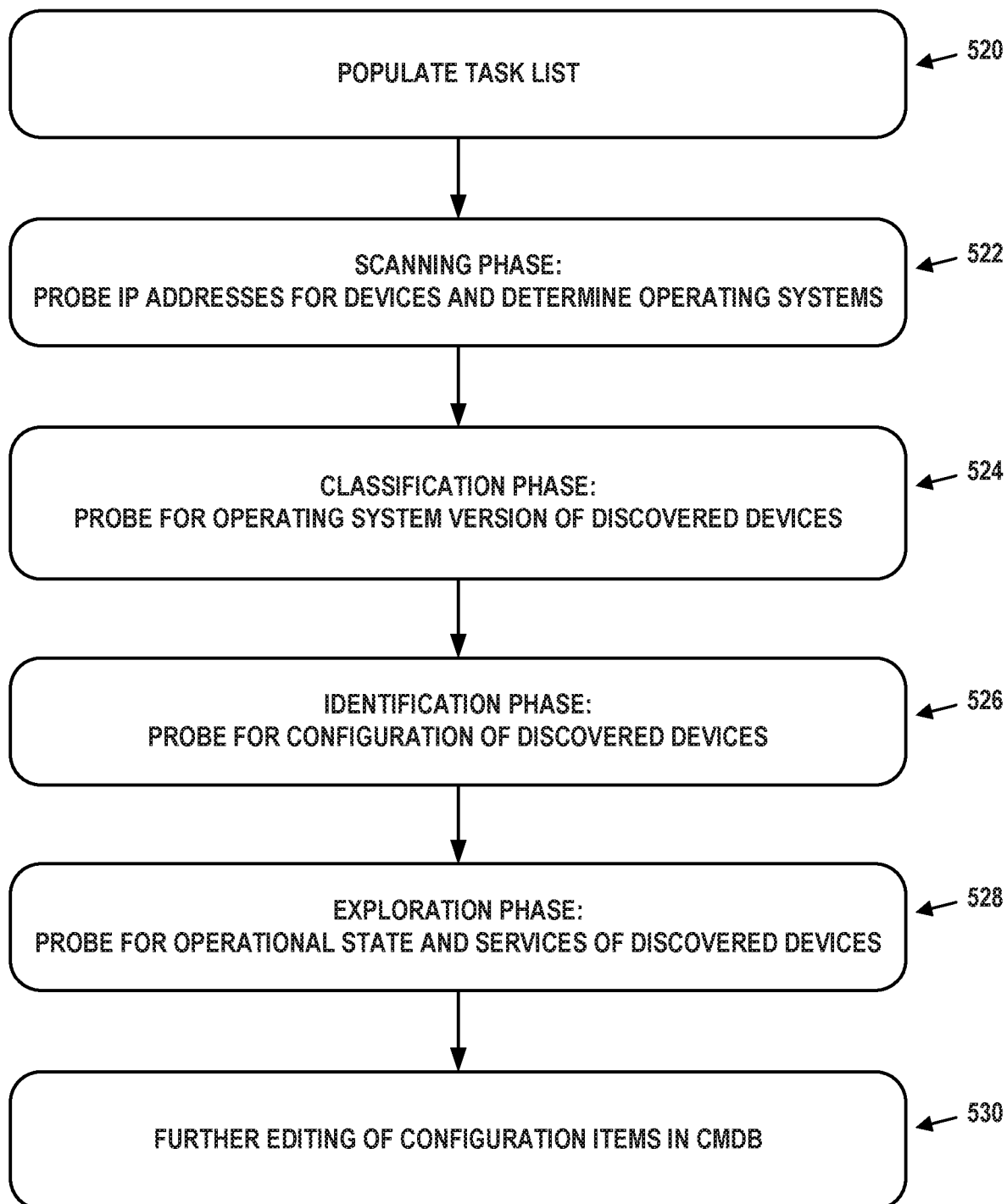
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE STREAMING OF CLOUD SERVICE RESOURCE USAGE REPORTS

Managed network 300 may use a third-party network for a variety of computing and/or network resources to fulfill operational needs or demands without necessarily having to deploy additional hardware or infrastructure. The third-party network may also be referred to as a cloud or datacenter, and the resources they provide may also be referred to as cloud resources. As an example, managed network 300 may use the computing resources of a third-party network to meet growing or fluctuating computational needs, document control and security, and to enable remote access to applications and services. The third-party provider may dynamically allocate computing resources for managed network 300. Examples of such computing resources may include processing power, data storage, and networking services, among others.

A third-party network may provide resources on some form of fee basis that generally falls into one of two categories broadly described as on-demand usage and reserved instances (i.e., purchasing the computing resources via one or more reserved instances). When using computational resources on-demand, managed network 300 obtains the computational resources as needed. The third-party provider may monitor usage of computing resources allocated to managed network 300, which can enable the third-party provider to charge managed network 300 accordingly. For example, the third-party provider may charge managed network 300 based on a duration that managed network 300 used computational resources on-demand and/or based on a quantity of computational resources used on-demand. The manner in which the third-party provider measures usage may vary. As an example, when managed network 300 uses computational resources for processing, the third-party provider may measure a number of processor cores used. Alternatively, when managed network 300 uses computational resources for data storage, the third-party provider may measure the amount of data (e.g., gigabytes, terabytes, etc.) was allocated for storage.

When obtaining computational resources through reserved instances, managed network 300 may enter into an agreement with the third-party provider. The agreement may represent a quantity of computing resources reserved by managed network 300 over an agreed upon term (e.g., 1 year, 3 years) and may involve an upfront payment or a payment plan between managed network 300 and the third-party provider. The use of reserved computing resources by managed network 300 may depend on various factors, including an account maintained by the third-party provider, region of use by managed network 300, and instance type, among others.

The usage of computational resources by managed network 300 can vary depending on the time of day. In some cases, managed network 300 may only require access to certain resources during specific hours (e.g., hours of operation). Similarly, the computational needs of managed network 300 can fluctuate throughout the day or week depending on various factors, such as demand from client devices 302 or customers. As such, management network 300 may attempt to manage computing resources obtained from a third-party network in order to avoid unwanted costs.

Figure 6:
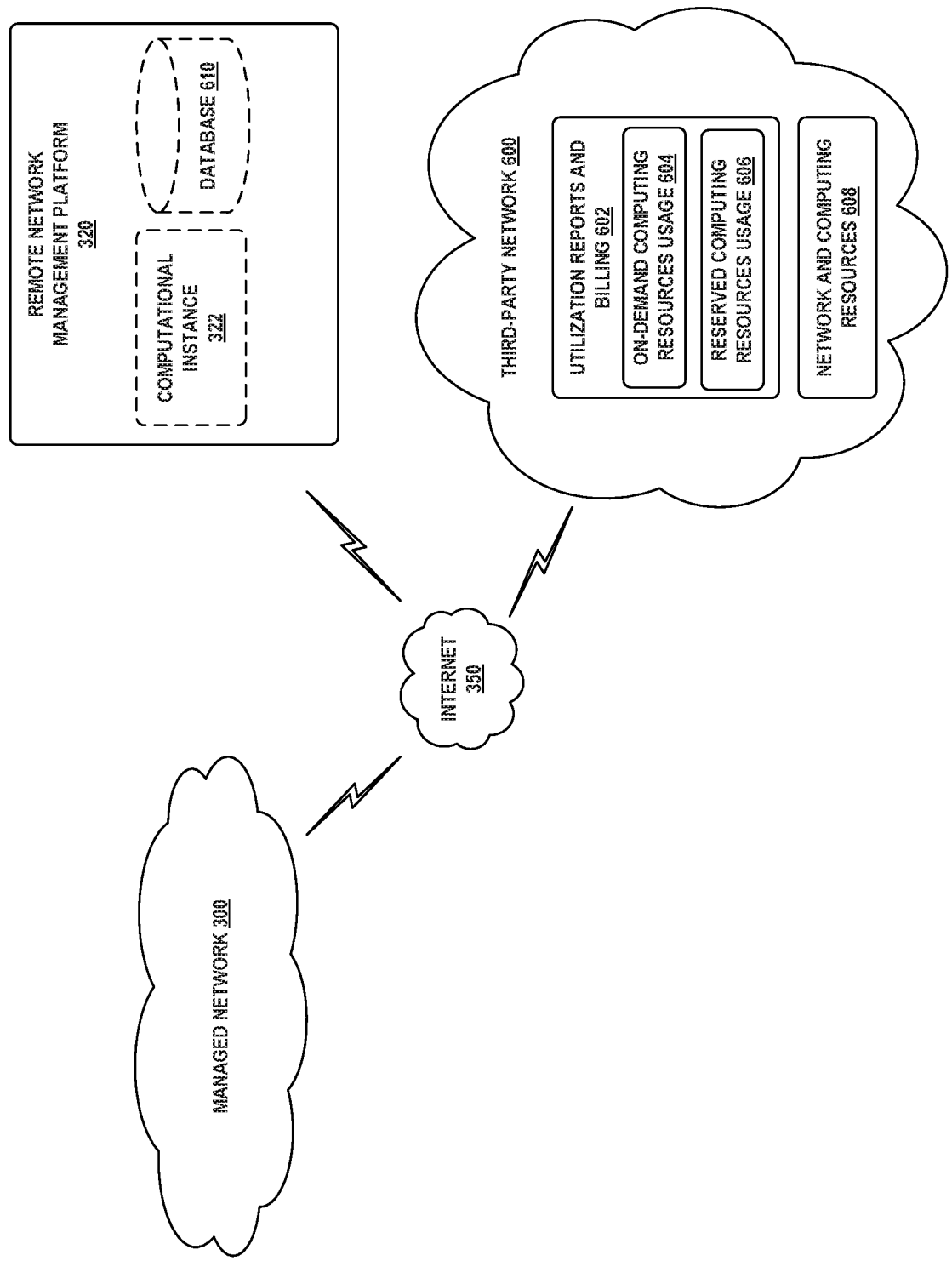
FIG. 6 depicts high-level relationships involving a managed network, a remote network management platform, and a third-party network, in accordance with example embodiments.

FIG. 6 is a simplified block diagram showing high-level relationships involving a managed network 300, a remote network management platform 320, and a third-party network 600, in accordance with example embodiments. As described above in connection with FIG. 3, the managed network 300, remote network management platform 320, and third-party network 600 may be communicatively connected by way of an intermediate network, such as an internet 350. Accordingly, the managed network 300 may access network and computing resources 608 to obtain various cloud resources. Network and computing resources 608 could include virtual machines and/or cloud storage, among other third-party resources. The third-party network may track or meter resource usage by the managed network 300 and record the usage in one or another form of database or other data storage arrangement, represented by utilization reports and billing 602. By way of example, utilization reports and billing 602 could be a database or other form of data storage configured for storing on-demand computing resources usage 604 and/or reserved computing resources usage 606.

For either form of usage and billing model, the third-party network may track resources used or consumed by a customer associated with the managed network 300. As such, the customer, which could be an enterprise, for example, may have an account with the third-party network. The third-party network may then bill customer's account on a periodic basis, such as monthly billing. Even for reserved instance billing, the third-party network may track detailed usage for the customer and store the data in the reserved computing resources usage 606.

In a typical arrangement, the third-party may provide the customer with a summary of usage for a given billing cycle. However, in order for the customer to assess its usage more comprehensively, it needs to be able to obtain the detailed usage and billing data. These data may correspond to relatively high-resolution time-based metering of resource usage, and constitute a large volume of data that makes acquisition by the customer relatively inconvenient and/or cumbersome. In addition, since the customer (e.g., enterprise) may have a billing agreement (e.g., account or accounts) with the third-party network separate from its relationship or subscription with a remote network management owner and/or service provider, access by the remote network management platform to the customer's third-party account information may involve coordination with the customer's managed network.

In accordance with example embodiments, the computational instance 322 may operate in a coordinated fashion with the managed network 300 to stream the time-based data to a database 610 in the remote network management platform 320, which may then use its considerable and well-suited analytical computing resources and specialized application programs to carry out a variety of processing and analysis tasks and operations. The customer associated with the managed network may thus obtain useful information for understanding how it is using the third-party resources, and in particular, how it may be more efficient and/or cost-effective in doing so.

Figure 7A:
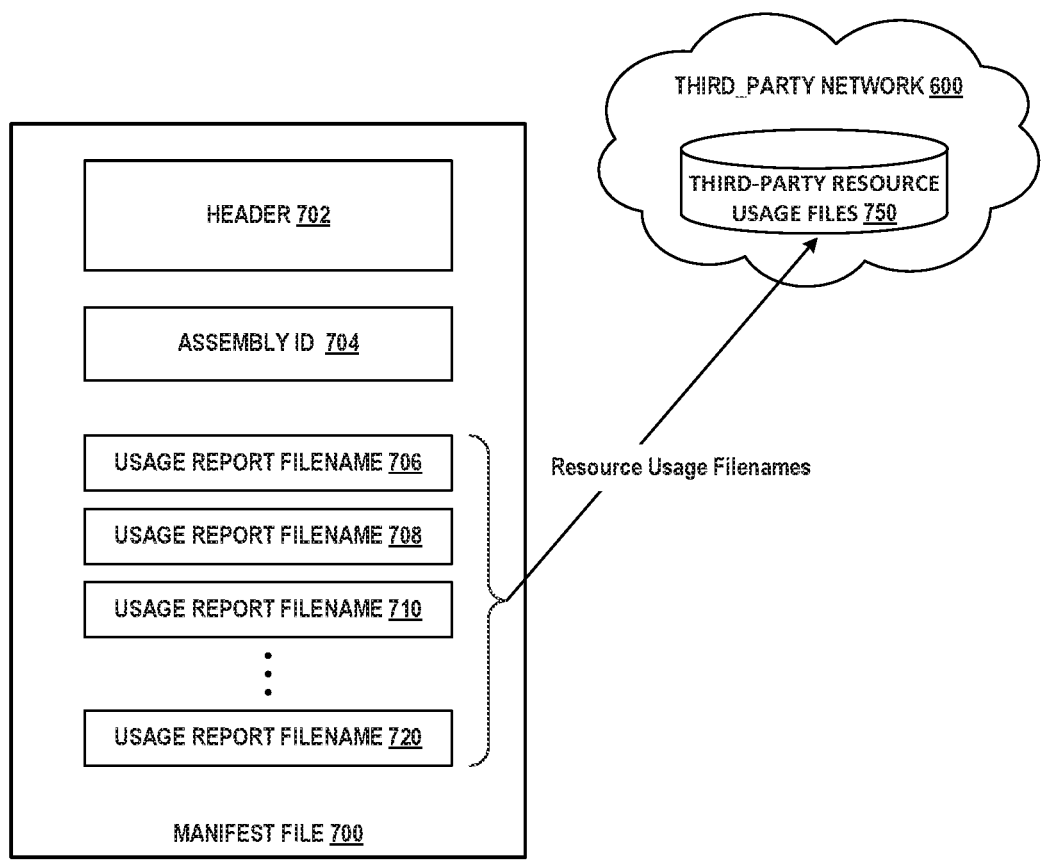
FIG. 7A illustrates an example manifest file and its relationship to third-party resource usage files, in accordance with example embodiments.

Systems and methods for streaming a managed network's third-party usage data from the third-party network to a remote network management platform via the managed network may be described by considering an example format and storage of detailed usage billing data in the third-party network. FIG. 7A illustrates such an example in which a manifest file 700 includes informational data, such as metadata, that describe the detailed usage data and specify where they are stored. It will be appreciated that different third-party networks may implement different formats of storage, which in turn may be described differently from one another. Thus, use of a manifest file may be used to account for such differences, as it supplies a mechanism for a form of metadata between the actual billing usage data and access to those data by a managed network and/or a remote network management platform. Accordingly, the manifest file illustrated in FIG. 7A, including the description herein of how it is used, is just one example, and not intended to be limiting with regard to example embodiments herein of systems and methods for streaming.

In the example of FIG. 7A, the manifest file 700 includes a header 702, and assembly ID 704, and usage report filenames 706, 708, 710, . . . , and 720, where the ellipses in the figure indicate that there could be additional usage report filenames. The header 702 may include descriptive date about the usage report files, such as formatting information, column names of tables, and usage data types (e.g., integer, floating point, etc.), among other information that may be common to the usage report files. The assembly ID may be used to uniquely identify a version of the manifest file 700 that might otherwise pertain to a common filename for the manifest file. For example, a given manifest file may pertain to a specific billing cycle for a particular account, and thus may have a filename reflective of an account name and billing cycle (e.g., date range). At the same time, the third-party network may update billing information on a daily (or other) basis throughout the billing cycle. As such, successive versions of the manifest file may correspond to incrementally more usage data. Each version may therefore have a different assembly ID to distinguish the otherwise commonly-named manifest files.

The usage report filenames 706, 708, 710, . . . , and 720 may be pointers, or associated with pointers, to actual data files that store the usage data. In the illustrated example, the usage data are stored in third-party resource usage files 750, as shown. These files may store large volumes of metered usage data for various third-party resources consumed by the enterprise. The data in each file could correspond to resource usage measurements record every hour over the course of a 24-hour period, for example. In addition to being associated with usage for a specific resource, each file may also be associated with a specific category with the customer's account. For example, distinct categories could be associated with different divisions, different geographic locations, or different functional organizations of an enterprise. Each of the different filenames may identify usage data files for the different account categories and third-party resource types.

Figure 7B:
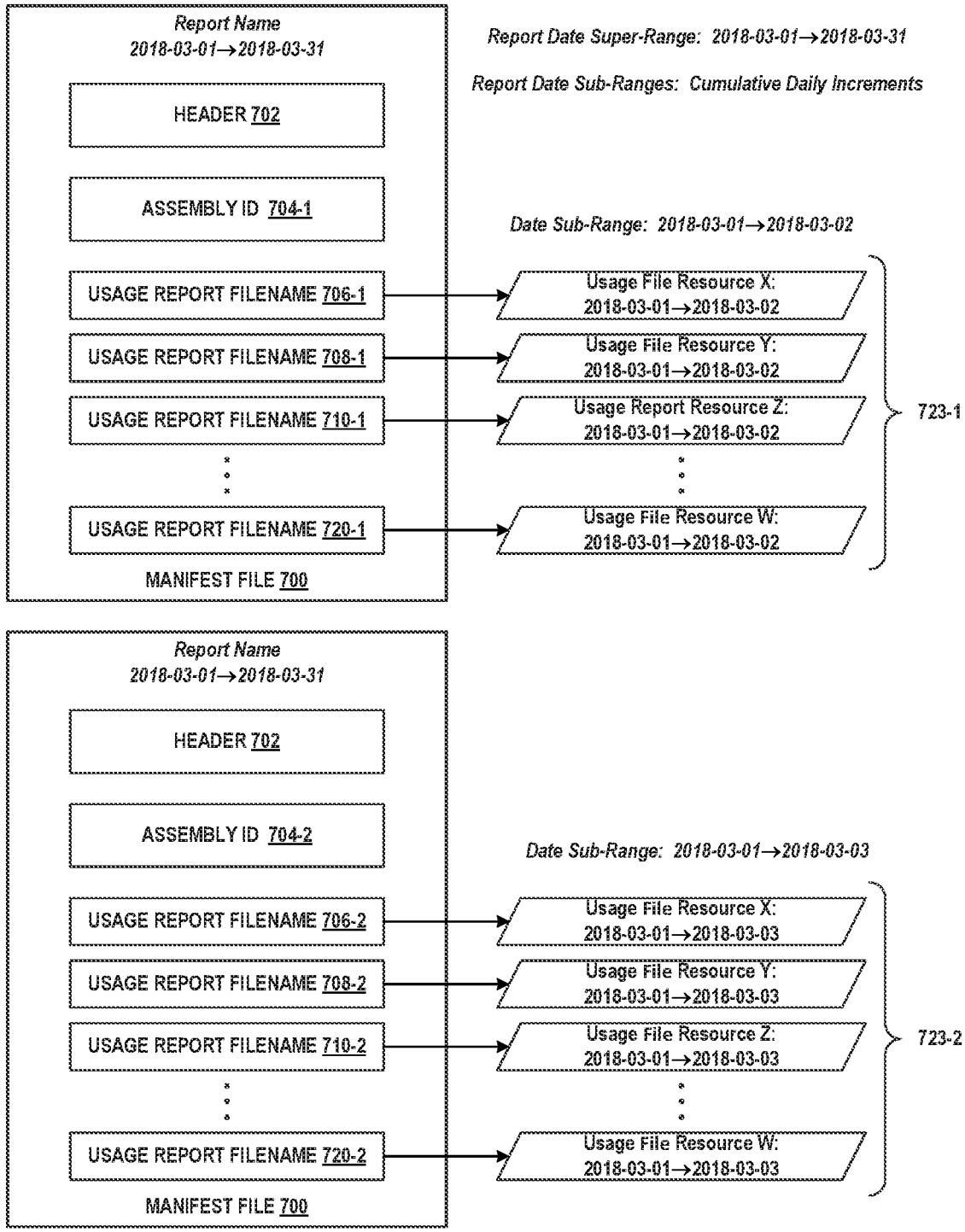
FIG. 7B illustrates a further example of manifest file contents and its relationship to third-party resource usage files, in accordance with example embodiments.

FIG. 7B illustrates, by way of example, how different versions of manifest file 700 may be associated with different date ranges of usage data within a common billing cycle. As shown, two versions of the manifest file 700 have a common filename that includes an example billing cycle of 2018-03-01 to 2018-03-31. For purposes of illustration, this is identified as a report date "super-range." Both versions also have a common header 702. However, each has a distinct assembly ID, namely assembly ID 704-1 and assembly ID 704-2. The usage report filenames are also different between the two versions of the manifest file. Namely, usage report filenames 706-1, 708-1, 710-1, . . . , and 720-1; and usage report filenames 706-2, 708-2, 710-2, . . . , and 720-2.

By way of example, the usage report filenames 706-1, 708-1, 710-1, . . . , and 720-1 point to usage report files 723-1 with a date "sub-range" of 2018-03-01 to 2018-03-02, or one day. Similarly, and also by way of example, the usage report filenames 706-2, 708-2, 710-2, . . . , and 720-2 point to usage report files 723-2, but with a date "sub-range" of 2018-03-01 to 2018-03-03, or a cumulative two days. Other arrangements could be used, such as storing consecutive one-day sub-ranges. The example names of the usage report files indicate the resource and the sub-range dates. For this example, usage report filenames 706-1, 708-1, 710-1, . . . , and 720-1 point to usage reports for resources identified as "X," "Y," "Z," and "W," respectively. The filenames include the resource and sub-range dates, as shown. The usage report filenames 706-2, 708-2, 710-2, . . . , and 720-2 also point to usage reports for resources identified as "X," "Y," "Z," and "W," respectively, but with different sub-range dates.

With the example arrangement as shown in FIGS. 7A and 7B, a manifest file may be identified according to dates of a super-range, such as billing cycle dates. Then the assembly ID may be used to determine dates of the sub-range covered by the usage report files listed in the manifest file. In accordance with example embodiments, this information could be used to access the usage report files and to open a streaming connection to stream the detailed usage data from its storage location in the third-party network to one or more databases in the remote network management platform.

As described above, the resource usage files may contain usage measurements metered every hour (or on some other interval) over the course of successive days of a billing cycle. The data may therefore be represented as time series data, which records usage values and/or quantities derived therefrom at each of a series of successive, discrete times (e.g., every hour). The resource usage files may also contain constant or nearly constant data associated with particular sets of time series data, such as data that identify specific resources, account names, customer categories, and so on. Thus a given resource usage file (e.g., associated with a given usage report filename) may include a collection of constant or nearly constant data and an associated collection of time series data that include usage measurements and/or derived quantities at a series of time markers.

In accordance with example embodiments, streaming of third-party resource usage data from a third-party network 600 to the remote network management platform 320 may be done in an efficient and flexible manner by separately storing the received time series data and associated constant data in two differently formatted and constructed databases. Specifically, the received time series data may be stored in a specialized database of files structured for time series data, while the constant data may be stored in records of a relational database. For purposes of the discussion herein, the constant or nearly constant data may be referred to as "static data," and the time series data may be referred to as "metric data." Accordingly, the database of time series files may be referred to herein as a metric base data base (MBDB), and the database of constant data may be referred to herein as a static records data base (SRDB). It will be appreciated that these terms, while descriptive of time series and constant components of third-party resource usage files, may not necessarily correspond to terms assigned by any given third-party network to describe the data stored in the third-party network.

Figure 8A:
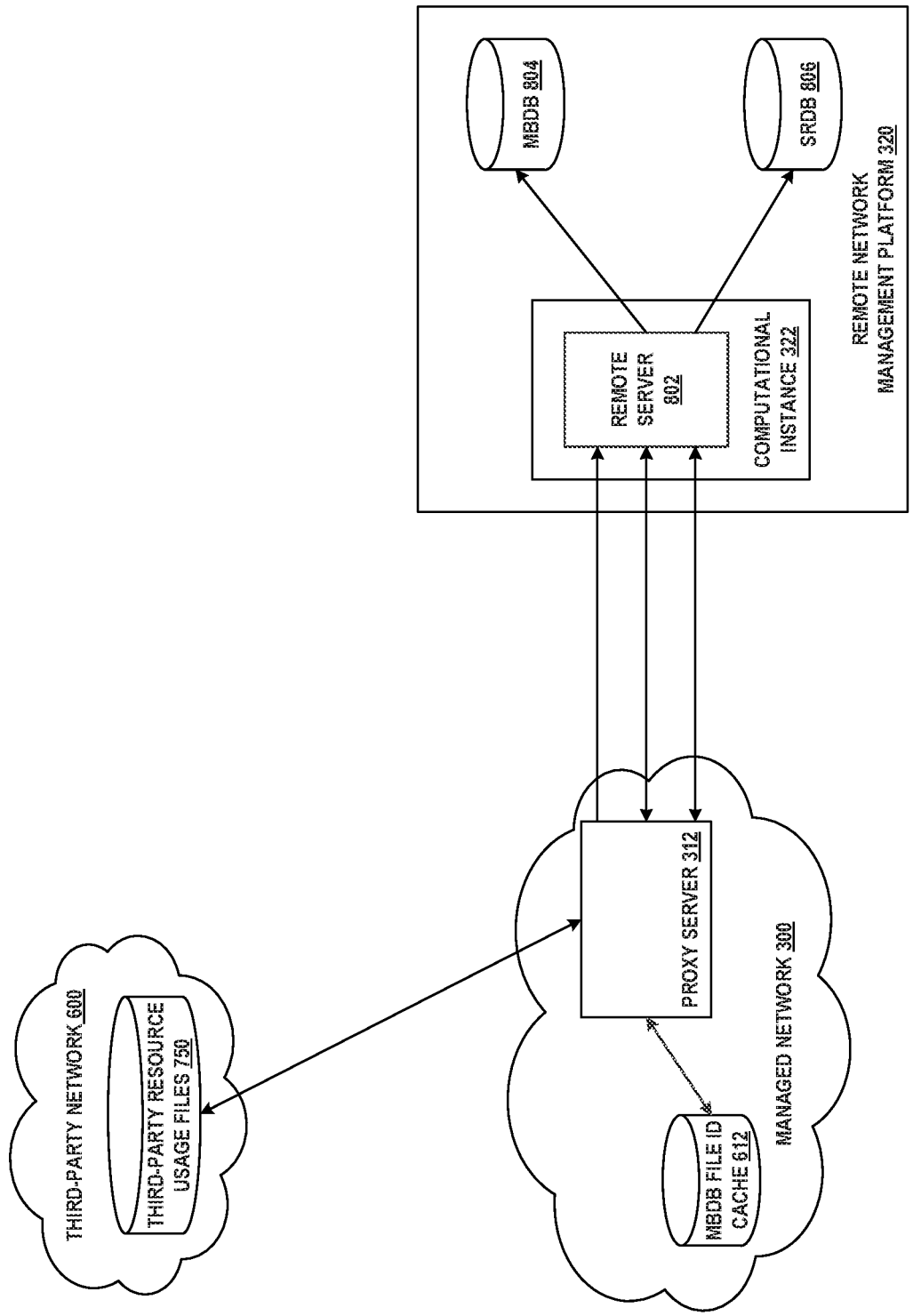
FIG. 8A depicts an example architecture involving a third-party network, in accordance with example embodiments.

FIG. 8A depicts an example architecture involving a managed network 300, a third-party network 600, and a remote network management platform 320, in accordance with example embodiments. As in FIG. 7A, usage data may be stored in third-party resource usage files 750 in the third-party network 600. The managed network may include a proxy server 312 and a cache 612 for storing MBDB file IDs, the purpose of which is described below. The remote network management platform may include a computational instance 322, an MBDB 804, and a SRDB 806. The computational instance 322 may include a remote server 802. Other elements and/or components of the managed network 300, remote network management platform 320, and computational instance 322 shown, for example in FIG. 3, have been omitted from FIG. 8A for the sake of clarity only.

As shown, the proxy server 312 may be communicatively connected with the third-party resource usage files 750, as well as with the cache 612. Communicative connections are also shown between the proxy server 312 and the remote server 802, and between the remote server and each of the MBDB 804 and the SRDB 806. As described below, these connections support interactions and coordinated operations between the connected entities in the service of streaming and storage in the remote network management platform 320 of third-party resource usage data.

Figure 8B:
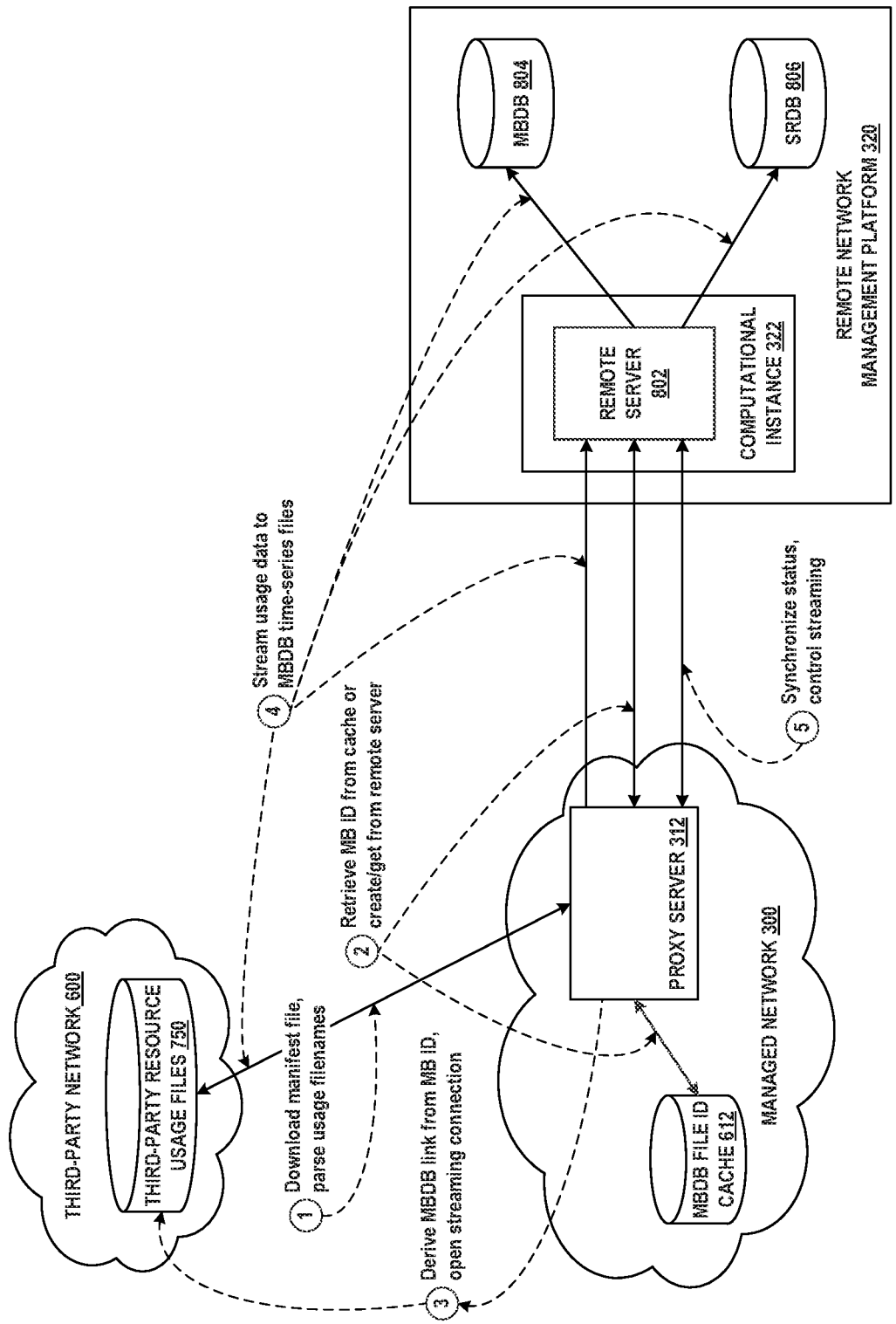
FIG. 8B depicts certain operations for streaming billing usage data in an example architecture involving a third-party network, in accordance with example embodiments.

FIG. 8B reproduces the architectural components of FIG. 8A, and adds numbered annotations illustrating example communications and operations, in accordance with example embodiments. The intent of FIG. 8B is mainly to identify the various communication paths that are used, and to associate particular operations of the download-streaming process with them. In this vein, however, it is noted that the numbered operations FIG. 8B do not necessarily represent all the steps carried involved in download-streaming of third-party usage data, and the numbering sequence may not necessarily reflect an exact ordering of operations in all instances.

In example operation, download-streaming of third-party resource usage data may be initiated by an end user in the managed network. For example, personnel of the enterprise interested and/or responsible for evaluating billing by a third-party network for resources consumed under some form of service agreement may initiate download-streaming of the usage data as a procedure in preparation for assessment and analysis of the data. As described above, the assessment and analysis may make use of tools and applications also provided by the remote network management platform. During the course of download-streaming of the billing usage data, the enterprise personnel may wish to view download status, such as percentage completion, viewing status and/or error messages, or the like. The personnel may also wish to control the download streaming, such pausing, restarting, and/or canceling one or more download. A third-party network typically does not provide such convenient and flexible download services and operations, if they provide any at all. Accordingly, embodiments described herein support and provide convenient, efficient, and flexible download-streaming operations for obtaining third-party resource usage data, thereby filling a need generally left unmet by third-party networks.

In the operation labeled 1, a manifest file is downloaded from the third-party resource usage files 750 to the proxy server 312. As noted, this operation may be carried out in response to, or as part of, an action by an end-user in or of the managed network to initiate the download. The file is then parsed to obtain the assembly ID and to determine the usage report filenames in the downloaded manifest file. The assembly ID may be used to determine if the data associated with this manifest file has already been downloaded. If the associated data have not already been downloaded, or they have but the user indicates that the associated data should be re-downloaded, the processing to set up the download-streaming continues. Otherwise, further processing for download-streaming of these data is skipped.

If processing is not skipped, then the usage reports associated with the usage report filenames are processed to determine identifiers of MBDB files for storing the associated metric data that will be download-streamed from the third-party network. These MBDB file identifiers are referred to herein as MBDB file IDs or just MB file IDs. In an example embodiment, processing of the usage files to determine the MBDB file IDs may be done one file at a time. However, in other example embodiments, processing of the usage files could be done in parallel.

In the operation labeled 2, the proxy server 312 checks which, if any, of the determined MBDB file ID already exists in the cache 612. For each MBDB file ID found in the cache 612, a time series filed for the metric data already exists in the MBDB 804. For each MDBD file ID not found in the cache 612, a new MBDB file and file ID needs to be created. The operation labeled 2 corresponds to either of these alternative actions; that is, retrieving the MB ID from either the cache 612 or in a transactional query to the remote server 802. Note that this operation may be carried out in tandem with each MBDB file ID determination, one at a time, or could be done a batch or parallel manner.

The MB ID may be used to derive or determine links to the MBDB time series file for receiving and recording the metric data of the associated third-party resource usage files. This operation is signified by label 3, where the proxy server 312 communicates with the third-party network to open up one or more download-streaming connections for each of one or more of the third-party resource usage files listed in the downloaded manifest file. In some instances, a download-streaming connection may be opened for each file listed in the manifest file; in other instances, download-streaming connections may be opened for just a subset of the files listed in the manifest file. Multiple download-streaming connections may be opened in series, parallel, or both.

The operation labeled 4 involves streaming the selected usage files from the third-party resource usage files 750 to the MBDB 804 and SRDB 805 by way of the opened download-streaming connections. As indicated, the path of download-streaming connections is by way of the proxy server 312 and the remote server 802 in the computational instance 322. Advantageously, the customer of the third-party network (e.g., an enterprise) makes its account information and access to the third-party billing available to the remote network management platform by way of the proxy server 312, which already has established connections with one or more remote servers 802 of the computational instance 322.

The operation labeled 5 involves synchronizing status information relating to the download streaming. In accordance with example embodiments, the synchronization allows an end user to view status of one or more ongoing download, and/or to control one or more ongoing downloads. As shown, the synchronization may involve communications and/or transactions between the remote server 802 and the proxy server 312. Although the label 5 may suggest that this operation occurs last, it should be noted that synchronization operations could occur at regular and/or user-selected intervals throughout download-streaming of multiple usage files.

It will be appreciated that the operations illustrated in FIG. 8B represent just one example of operations that may be carried out in systems and method for downloading third-party resource usage data. Other arrangements of operations are possible as well.

Figure 9:
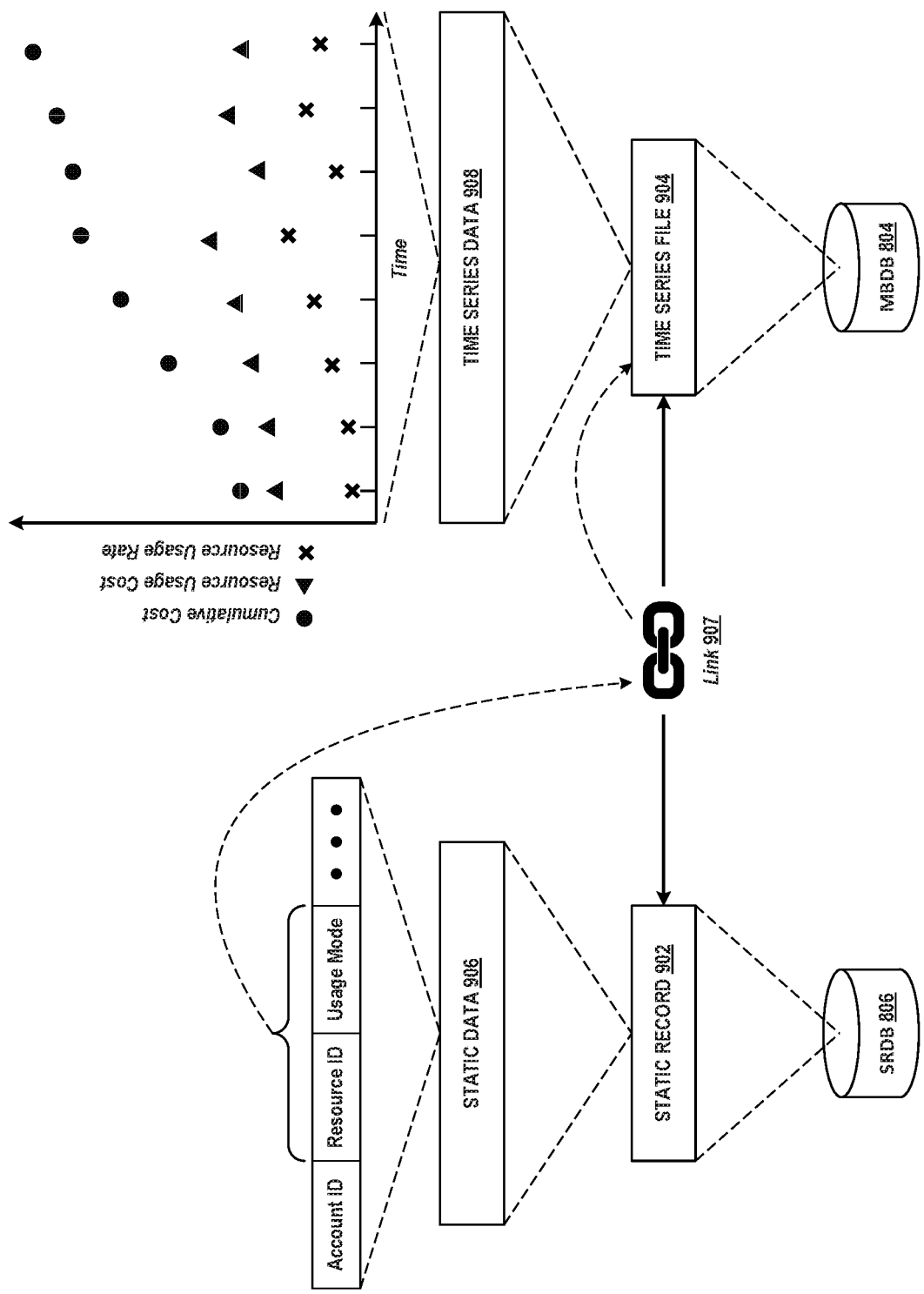
FIG. 9 depicts example organization and logical associations of data records, in accordance with example embodiments.

FIG. 9 illustrates an example organization and logical associations of data records, in accordance with example embodiments. In particular, FIG. 9 illustrates an example relationship between static data and metric data. In accordance with example embodiments, the SRDB 806 may be configured to store static records, each including static data associated with third-party billing for a specific third-party resource. This represented in FIG. 9 by static record 903, which includes static data 906. By way of example, static data 906 may be structured to include various data fields including an account ID, a resource ID, and a usage mode, among other possible static data (indicated by ellipses). The resource ID may be an identifier of the specific third-party resource, while the usage mode may be a descriptor of how the resource is (or has been) used by the managed network.

Also in accordance with example embodiments, the resource ID and usage mode may be used jointly (e.g., combined in some algorithmic manner) to derive a link 907 that points to or is associated with a time series file 904 in the MBDB 804, as indicated. In accordance with example embodiments, the time series file 904 may include time series data 908 corresponding to the metric usage data for the specific third-party resource. A conceptual illustration of the time series data (metric data) according to an example embodiment is also shown in FIG. 9.

In particular, the time series data 908 may correspond to usage measurements or metering by the third-party network an each of a series of periodic times over the course of a billing cycle or some sub-interval thereof. For example, a given time series file 904 may contain time series data 908 for a single day of a billing cycle measured or metered every hour. Alternatively, a given time series file 904 may contain time series data 908 accumulated over a portion of the billing cycle, such as the first 1, 2, 3, . . . , days of the billing cycle, again measured or metered every hour. Other sub-intervals are possible as well.

The conceptual illustration of example time series data is represented graphically as metered amounts of a resource consumed and/or derived quantities thereof at each of the periodic times. In the figure, resource usage rate for each measurement interval is plotted with crosses, resource usage cost is plotted with triangles, and cumulative cost is plotted with circles. The specific quantities measured and how they are metered may differ depending on the third-party network provider, as well as on the specific resources being tracked or other possible information. In the illustrated conceptual example, usage rate may be measured as a total amount consumed in a given hour, and the cost may then be derived by multiplying the rate by the cost per unit of resource consumed. The cumulative cost may then be determined as a sum of the cost at each measurement time (e.g. each hour).

For example, the rate of virtual machine usage per hour may be calculated as a percentage (or fraction) of each hour that virtual machine cycles are metered as in use divide by the duration (one hour). Cost per hour might be calculated as the metered rate multiplied by the third party's charge for each hour of consumed virtual machine cycles. Other charging models could be used as well by a third-party network. The quantitative description and format of the metric data thus may correspond to the specific form of the resource usage data as defined and stored by the third party network. The specific time series data included in this illustration are shown by way of example, and not intended to be limiting. Other forms of metered usage data that can be represented in time series could be include as well or instead, and any one of the illustrated forms could be omitted.

In accordance with example embodiments, the time series (metric) data stored in the MBDB 804 may include quantitative values in a numeric format, such as floating point numbers, at each of the measurement times (e.g., per hour). It will be appreciated that floating point number could be stored with varying numerical precision, such as 32-bit, 64-bit, and so on. Other numerical formats could be used for time series data as well.

VI. EXAMPLE OPERATIONS AND METHODS

Figure 10:
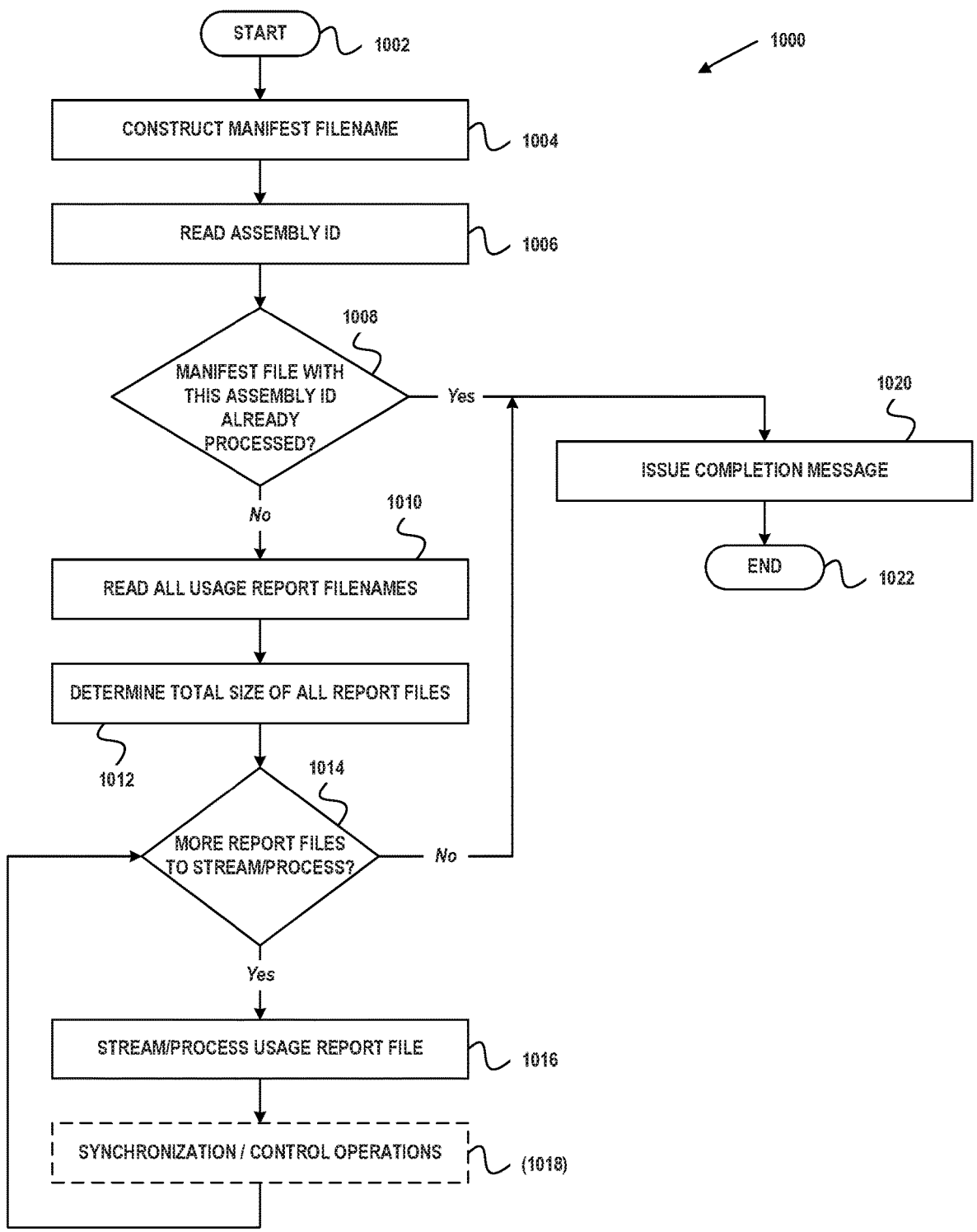
FIG. 10 is a flow chart of example operations involved in streaming billing usage data, in accordance with example embodiments.
Figure 11:
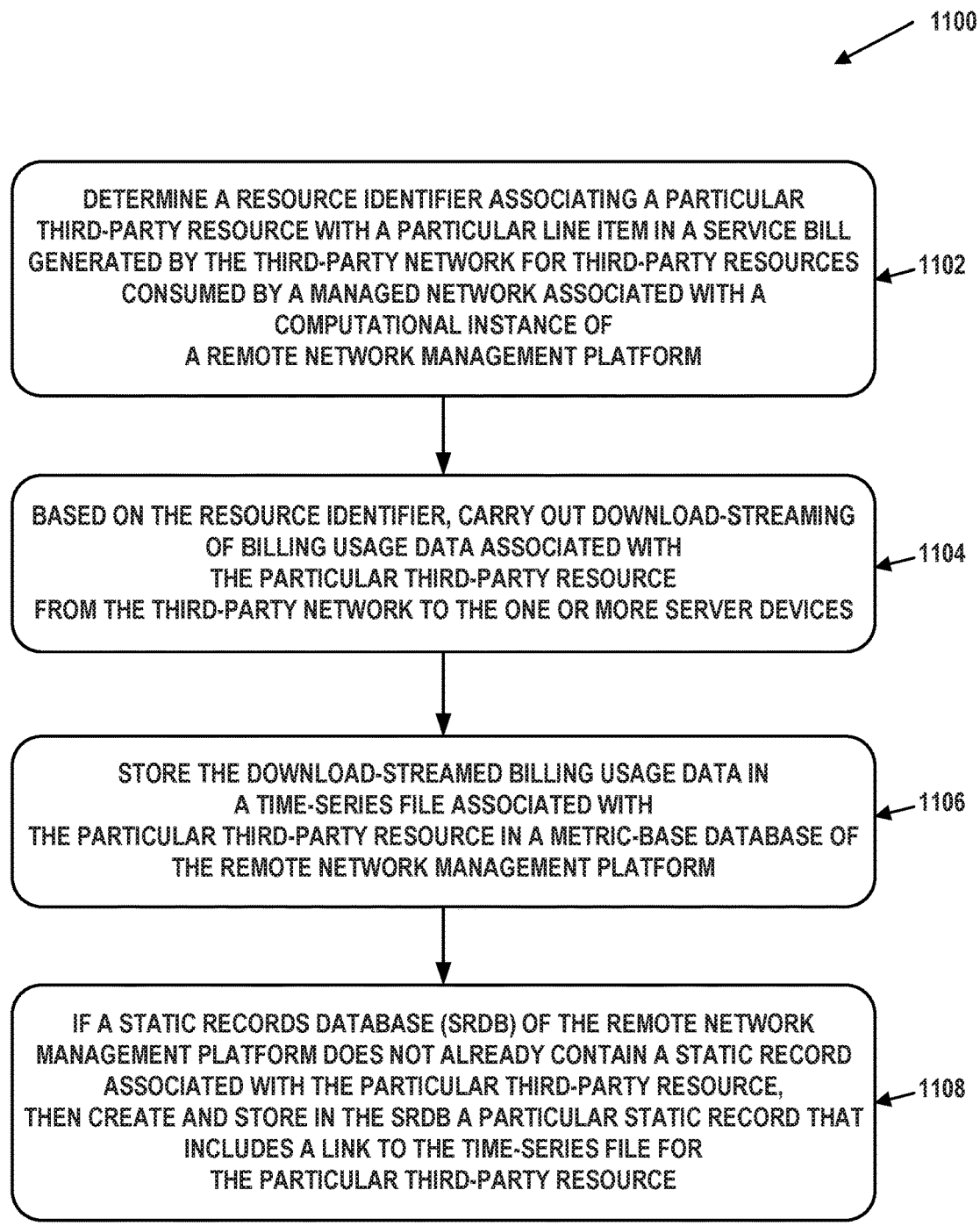
FIG. 11 is a flow chart of an example method, in accordance with example embodiments.

FIG. 10 is a flow chart illustrating of operations 1000 involved in streaming billing usage data, in accordance with example embodiments. FIG. 11 is a flow chart illustrating an example embodiment of a method 1100. Both example operations 1000 and example method 1100 may be carried out by a computing device, such as computing device 100, and/or a cluster of computing devices, such as server cluster 200. However, the processes and operations can be carried out by other types of devices or device subsystems. For example, the process could be carried out by a portable computer, such as a laptop or a tablet device. In example embodiments, the operations and method illustrated in FIGS. 10 and 11 may be carried out by a computing device disposed within a managed network, such as network 300, and/or may be carried out by a computing device disposed within a computational instance, such as instance 322, of a remote network management platform, such as platform 320, which remotely manages a managed network, such as network 300.

Thus, the example operations 1000 and method 1100 may be implemented and/or executed by more than one computing device or server. For example, the operations 1000 and method 1100 may involve some actions and operations carried out by a computing device in the managed network, such as a proxy server, and may also involve actions and operations of a remote server device in a computational instance. Other actions and operations may involve one or more databases of the remote network management platform as well.

The embodiments of FIGS. 1000 and 1100 may be simplified by the removal of any one or more of the features shown therein. Further, these embodiments may be combined with features, aspects, and/or implementations of any of the previous figures or otherwise described herein.

The operations 1000 and method 1100 may be carried out in a system configured for streaming billing data to a remote network management platform from a third-party network. More particularly, the billing data may be associated with usage of resources provided by the third-party network to a managed network. The managed network may be associated with a computational instance of the remote network management platform. The system may include a metric-base database (MBDB) disposed within the remote network management platform and configured for storing time series data. In accordance with example embodiments, the time series data may specify usage quantities of third-party resources consumed by the managed network per unit time over specified time intervals. The system may further include a static records database (SRDB) disposed within the remote network management platform and configured for storing database records that are associated with the time series data. SRDB records may also include data for identifying the third-party resources and for recording static information relating to billing for the third-party resources. The system may also include one or more server devices configured to carry out various operations of the example method 1100, possibly as well as other functions and operations not necessarily explicitly described herein.

The example operations 1000 and method 1100 may also be embodied as instructions executable by one or more processors of the one or more server devices of the system. For example, the instructions may take the form of software and/or hardware and/or firmware instructions. In an example embodiment, the instructions may be stored on a non-transitory computer readable medium. When executed by one or more processors of the one or more servers, the instructions may cause the one or more servers to carry out various operations of the example method.

The example operations 1000 of FIG. 10 are described first, followed by a description of the example method 1100 of FIG. 11.

Example operation starts at step 1002, following which a manifest filename is constructed at step 1004. This may involve applying a naming pattern that includes, for example, a date range, such as a billing cycle, and an account name. The operation may be performed by the proxy server or an application on an end user device, in response to an end user initiating a download-streaming operation.

The manifest file is then downloaded to the proxy server from the third party network, and at step 1006, the assembly ID is read. At step 1008, a determination is made if this assembly ID has already been processed. That is, if the usage data associated with the manifest file have already be download-streamed and stored in the MBDB and SRDB. If the assembly ID has been processed ("Yes" branch from step 1008), a completion message indicating completion of operations is issued at step 1020, which then ends operations at step 1022. Although not explicitly indicated in step 1008, a user could choose to re-download data associated with an assembly ID that has already been processed. Allowing for this qualification, the "Yes" branch from step 1008 could correspond to the assembly ID having already been processed and the user not choosing to re-download the previously-processed data.

If the assembly ID has not be previously processed ("No" branch from step 1008), then the usage report filenames are read at step 1010, followed by a determination of the total size of all the usage reports at step 1012. The sizes may be determined in preparation for receiving the data, for example. Allowing, again, for the user choosing to re-download data associated with an assembly ID that has already been processed, the "No" branch from step 1008 could correspond to the assembly ID not having already been processed, or the user choosing to re-download previously-processed data.

A loop that download-streams the metric data is then begun at step 1014. Specifically, a streaming connection from the third-party network may be opened and download-streaming of the first listed usage file may commence. As noted, streaming from the third-party network to the MBDB is by way of the proxy server in the managed network and remote server in the associated customer instance. Loop control checks if there any remaining usage files from the list of filenames. If there are ("Yes" branch from step 1014), then the next usage file is download-streamed to the MBDB at step 1016.

The download-streaming step may include or be followed by synchronization and control operations 1018, shown with dotted-line block, since this step may not necessarily be executed for every download-streaming operation. Synchronization and control may entail the remote server providing status to the proxy server of the download-streaming process, such as percentage complete. It may also provide an end user with the ability to pause, cancel, and/or restart download-streaming.

If the loop control step 1014 determines that there are no more usage files to be download-streamed from the filename list ("No" branch from step 1014), then a completion message indicating completion of operations is issued at step 1020, which then ends operations at step 1022.

The example method 1100 of FIG. 11 is next described.

Block 1102 may involve the one or more servers determining a resource identifier associating a particular third-party resource with a particular line item in a service bill generated by the third-party network for third-party resources consumed by the managed network.

Block 1104 may involve, the one or more servers carrying out download-streaming of billing usage data associated with the particular third-party resource from the third-party network to the one or more server devices. The downloading operation may be based, at least in part, on the resource identifier.

Block 1106 may involve the one or more servers storing the download-streamed billing usage data in a time-series file associated with the particular third-party resource in the MBDB.

Finally, block 1108 may involve the one or more servers creating and storing in the SRDB a particular static record that includes a link to the time-series file for the particular third-party resource. In particular, creating and storing the SRDB record may be carried out if the SRDB does not already contain a static record associated with the particular third-party resource.

In accordance with example embodiments, the example method may further entail operations and/or steps for download-streaming at least one additional billing usage data file. Specifically, the example method may entail determining a different resource identifier associating a different third-party resource with a different line item in the service bill. Then, based on the different resource identifier, carrying out download-streaming of different billing usage data associated with the different third-party resource from the third-party network to the one or more server devices, and storing the download-streamed different billing usage data in a different time-series file associated with the different third-party resource in the MBDB. If the SRDB does not already contain a static record associated with the different third-party resource, then a different static record may be created and stored in the SRDB. The different static record may include a link to the different time-series file for the different third-party resource.

In further accordance with example embodiments, the service bill may include a billing manifest file covering a specified date range and having a manifest filename common to one or more versions of the billing manifest file. The billing manifest file may include (i) a list of one or more resource-report identifiers, each associated with a respective resource-usage report for a respective third-party resource, and (ii) an assembly identifier unique to a particular version of the billing manifest file. In an example embodiment, each of the one or more versions may correspond to a unique combination of the one or more resource-report identifiers in the list, specific date ranges covered by the respective resource-usage reports associated with the one or more resource-report identifiers in the list, or both. With this arrangement, determining the resource identifier may entail downloading the billing manifest file from the third-party network, and determining from the downloaded billing manifest file a resource-usage identifier associated with a resource-usage report for the particular third-party resource.

In accordance with example embodiments, carrying out download-streaming of the billing usage data based on the resource identifier may entail opening a download-streaming connection from the third-party network for the resource-usage report for the particular third-party resource. The example method may further entail forgoing download-streaming any resource-usage reports associated with resource-usage identifiers included in any given downloaded billing manifest file if the assembly identifier matches that of a previously downloaded and processed billing manifest file. In further accordance with example embodiments, if the assembly identifier matches that of a previously downloaded and processed billing manifest file, one or more of the resource-usage reports may be re-downloaded upon a user indication to do so. That is, automatic skipping of download-streaming of previously-downloaded resource-usage reports may be overridden by a user command or other user preference indication.

In accordance with example embodiments, the method may further entail determining the resource identifier from service bill information downloaded from the third-party network to the proxy server, and determining the MBDB file identifier based at least in part on the resource identifier. Then, if the MBDB file identifier is stored in a local cache associated with the proxy server, the MDBD file identifier may be retrieved from the local cache. If the MBDB file identifier is not stored in a local cache associated with the proxy server, then a request for the MBDB file identifier may be transmitted from the proxy server to the remote server to obtain the MBDB file identifier. The link may be derived from the MBDB file identifier, and the time-series file for storing the download-streamed billing usage may be identified according to the derived link.

In accordance with example embodiments, the example method may further entail monitoring status of the download-streaming of the billing usage data, and transmitting monitored status information to a client computing device communicatively connected in or with the managed network. The status information may include percentage completion, for example. The example method may additionally involve receiving one or more interactive commands from the client computing device to control the download-streaming. The one or more interactive commands may correspond to control actions, such as aborting download, pausing download, and/or restarting download.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system for streaming billing data to a remote network management platform from a third-party network, wherein the billing data are associated with usage of resources provided by the third-party network to a managed network that is associated with a computational instance of the remote network management platform, the system comprising:
   a metric-base database (MBDB) disposed within the remote network management platform and configured for storing time series data, wherein the time series data comprise data specifying usage quantities of third-party resources consumed by the managed network per unit time over specified time intervals;

a static records database (SRDB) disposed within the remote network management platform and configured for storing database records that are associated with the time series data and include data for identifying the third-party resources and for recording static information relating to billing for the third-party resources; and one or more server devices configured to:
  determine a resource identifier associating a particular third-party resource with a particular line item in a service bill generated by the third-party network for third-party resources consumed by the managed network;
  based on the resource identifier, carry out download-streaming of billing usage data associated with the particular third-party resource from the third-party network to the one or more server devices;
  monitor a status of the download-streaming of the billing usage data;
  transmit status information indicative of the monitored status to a client computing device communicatively connected in or with the system, wherein the status information includes a percentage completion;
  receive one or more interactive commands from the client computing device to control the download-streaming, wherein the one or more interactive commands correspond to control actions, the control actions comprising abort download, pause download, or restart download, or a combination thereof;
  store the download-streamed billing usage data in a time-series file associated with the particular third-party resource in the MBDB; and
  if the SRDB does not already contain a static record associated with the particular third-party resource, create and store in the SRDB a particular static record that includes a link to the time-series file for the particular third-party resource.

2. The system of claim 1, wherein the one or more server devices are configured to:
  determine a different resource identifier associating a different third-party resource with a different line item in the service bill;
  based on the different resource identifier, carry out download-streaming of different billing usage data associated with the different third-party resource from the third-party network to the one or more server devices;
  store the download-streamed different billing usage data in a different time-series file associated with the different third-party resource in the MBDB; and
  if the SRDB does not already contain a static record associated with the different third-party resource, create and store in the SRDB a different static record that includes a link to the different time-series file for the different third-party resource.

3. The system of claim 1, wherein the service bill comprises a billing manifest file covering a specified date range and having a manifest filename common to one or more versions of the billing manifest file, wherein the billing manifest file includes (i) a list of one or more resource-report identifiers, each associated with a respective resource-usage report for a respective third-party resource, and (ii) an assembly identifier unique to a particular version of the billing manifest file, wherein each of the one or more versions corresponds to a unique combination of at least one of: the one or more resource-report identifiers in the list, or specific date ranges covered by the respective resource-usage reports associated with the one or more resource-report identifiers in the list;
  wherein the one or more server devices are configured to download the billing manifest file from the third-party network;
  and wherein determining the resource identifier comprises determining from the downloaded billing manifest file a resource-usage identifier associated with a resource-usage report for the particular third-party resource.

4. The system of claim 3, wherein based on the resource identifier, carrying out download-streaming of the billing usage data associated with the particular third-party resource from the third-party network to the one or more server devices comprises:
  opening a download-streaming connection from the third-party network for the resource-usage report for the particular third-party resource.

5. The system of claim 3, wherein the one or more server devices are configured to forgo download-streaming any resource-usage reports associated with resource-usage identifiers included in any given downloaded billing manifest file upon first determining that the assembly identifier included in the any given downloaded manifest file matches that of a previously downloaded and processed billing manifest file.

6. The system of claim 1, wherein the one or more server devices are comprised in a proxy server disposed within the managed network and a remote server disposed within the computational instance,
  and wherein download-streaming of the billing usage data associated with the particular third-party resource from the third-party network to the one or more server devices comprises streaming the billing usage data from the third-party network to the remote server via the proxy server as an intermediary device.

7. The system of claim 6, wherein the link to the time-series file for the particular third-party resource includes or is part of a MBDB file identifier of the time-series file, and the MBDB file identifier is associated with the resource identifier;
  and wherein the one or more server devices are configured to:
    determine the resource identifier from service bill information downloaded from the third-party network to the proxy server;
    determine the MBDB file identifier based at least in part on the resource identifier;
    if the MBDB file identifier is stored in a local cache associated with the proxy server, then retrieve the MDBD file identifier from the local cache;
    if the MBDB file identifier is not stored in a local cache associated with the proxy server, then transmit a request for the MBDB file identifier from the proxy server to the remote server to obtain the MBDB file identifier;
    derive the link from the MBDB file identifier; and
    identify the time-series file for storing the download-streamed billing usage according to the derived link.

8. A proxy server for streaming billing data to a remote network management platform from a third-party network, wherein the billing data are associated with usage of resources provided by the third-party network to a managed network that is associated with a computational instance of the remote network management platform, and wherein the proxy server is disposed within the managed network and comprises:

a communicative connection to the third-party network;
a communicative connection to a remote server disposed within the computational instance;
one or more processors; and
memory storing instructions that, when executed by the one or more processors, cause the proxy server to carry out operations including:
downloading, from the third-party network, a service bill for third-party resources consumed by the managed network, wherein the service bill comprises a billing manifest file covering a specified date range and having a manifest filename common to one or more versions of the billing manifest file, wherein the billing manifest file includes (i) a list of one or more resource-report identifiers, each associated with a respective resource-usage report for the respective third-party resource, and (ii) an assembly identifier unique to a particular version of the billing manifest file, wherein each of the one or more versions corresponds to a unique combination of: the one or more resource-report identifiers in the list, or specific date ranges covered by the respective resource-usage reports associated with the one or more resource-report identifiers in the list, or a combination thereof;
determining one or more resource identifiers each associating a respective third-party resource with a respective line item in the service bill, comprising determining from the billing manifest file respective resource-report identifiers associated with the respective resource-usage reports for the respective third-party resources;
based on the one or more resource identifiers, intermediating download-streaming of billing usage data associated with each respective third-party resource from the third-party network to a metric-base database (MBDB) for storage in a respective time-series file, wherein the MBDB is disposed within the remote network management platform and the download-streaming is by way of the remote server, and wherein each respective time-series file comprises respective time series data specifying usage quantities of the respective third-party resource consumed by the managed network per unit time over a respectively specified time interval; and
based on at least the one or more resource identifiers, providing the remote server with information for creating and storing respective static records in a static records database (SRDB) disposed within the remote network management platform, wherein the respective static records are associated with the respective time series data and each includes a respective link to the respective time-series file, and each includes respective data for identifying the respective third-party resource and for recording respective static information relating to billing for the respective third-party resource.

9. The proxy server of claim 8, wherein, based on the one or more resource identifiers, intermediating the download-streaming of billing usage data associated with each respective third-party resource from the third-party network to the MBDB comprises:
opening a respective download-streaming connection from the third-party network for each respective resource-usage report for the respective third-party resource.

10. The proxy server of claim 8, wherein the operations include:
making a determination that the assembly identifier included in the any given downloaded manifest file matches that of a previously downloaded and processed billing manifest file; and
in response to the determination, forgoing download-streaming any respective resource-usage reports associated with resource-usage identifiers included in the any given downloaded billing manifest file.

11. The proxy server of claim 8, wherein the respective link to the respective time-series file for the respective third-party resource includes or is part of a respective MBDB file identifier of the respective time-series file, and the respective MBDB file identifier is associated with a respective resource identifier;
and wherein the operations include:
determining each respective MBDB file identifier based at least in part on the respective resource identifier;
if the respective MBDB file identifier is stored in a local cache associated with the proxy server, then retrieving the respective MDBD file identifier from the local cache;
if the respective MBDB file identifier is not stored in a local cache associated with the proxy server, then transmitting a request for the respective MBDB file identifier from the proxy server to the remote server to obtain the respective MBDB file identifier;
deriving the respective link from the respective MBDB file identifier; and
identifying the respective time-series file for storing the download-streamed billing usage according to the derived respective link.

12. The proxy server of claim 8, wherein the operations include:
receive, from the remote server, status information relating to receipt and/or storage of the download-streaming of the billing usage data, wherein the status information includes a percentage completion;
transmit the status information to a client computing device communicatively connected in or with the managed network; and
receive one or more interactive commands from the client computing device to control the download-streaming, wherein the one or more interactive commands correspond to control actions, the control actions comprising abort download, pause download, or restart download, or a combination thereof.

13. A method for streaming billing data to a remote network management platform from a third-party network, wherein the billing data are associated with usage of resources provided by the third-party network to a managed network that is associated with a computational instance of the remote network management platform, wherein the remote network management platform comprises (i) a metric-base database (MBDB) configured for storing time series data, wherein the time series data comprise data specifying usage quantities of third-party resources consumed by the managed network per unit time over specified time intervals, and (ii) a static records database (SRDB) configured for storing database records that are associated with the time series data and include data for identifying the third-party resources and for recording static information relating to billing for the third-party resources, wherein the managed network comprises a proxy server and the computational instance comprises a remote server communicatively connected to the proxy server and to both the MBDB and the SRDB, and wherein the method comprises:

determining a resource identifier associating a particular third-party resource with a particular line item in a service bill generated by the third-party network for third-party resources consumed by the managed network;

based on the resource identifier, carrying out download-streaming of billing usage data associated with the particular third-party resource from the third-party network to the one or more server devices, wherein the download-streaming of the billing usage data associated with the particular third-party resource from the third-party network to the one or more server devices comprises streaming the billing usage data from the third-party network to the remote server via the proxy server as an intermediary device;

storing the download-streamed billing usage data in a time-series file associated with the particular third-party resource in the MBDB; and if the SRDB does not already contain a static record associated with the particular third-party resource, creating and storing in the SRDB a particular static record that includes a link to the time-series file for the particular third-party resource, wherein the link to the time-series file for the particular third-party resource includes or is part of a MBDB file identifier of the time-series file, and the MBDB file identifier is associated with the resource identifier;

determining the resource identifier from service bill information downloaded from the third-party network to the proxy server;

determining the MBDB file identifier based at least in part on the resource identifier;

if the MBDB file identifier is stored in a local cache associated with the proxy server, then retrieving the MDBD file identifier from the local cache;

if the MBDB file identifier is not stored in a local cache associated with the proxy server, then transmitting a request for the MBDB file identifier from the proxy server to the remote server to obtain the MBDB file identifier;

deriving the link from the MBDB file identifier; and identifying the time-series file for storing the download-streamed billing usage according to the derived link.

14. The method of claim 13, comprising:

determining a different resource identifier associating a different third-party resource with a different line item in the service bill;

based on the different resource identifier, carrying out download-streaming of different billing usage data associated with the different third-party resource from the third-party network to the one or more server devices;

storing the download-streamed different billing usage data in a different time-series file associated with the different third-party resource in the MBDB; and if the SRDB does not already contain a static record associated with the different third-party resource, creating and storing in the SRDB a different static record that includes a link to the different time-series file for the different third-party resource.

15. The method of claim 13, wherein the service bill comprises a billing manifest file covering a specified date range and having a manifest filename common to one or more versions of the billing manifest file, wherein the billing manifest file includes (i) a list of one or more resource-report identifiers, each associated with a respective resource-usage report for a respective third-party resource, and (ii) an assembly identifier unique to a particular version of the billing manifest file, wherein each of the one or more versions corresponds to a unique combination of at least one of: the one or more resource-report identifiers in the list, or specific date ranges covered by the respective resource-usage reports associated with the one or more resource-report identifiers in the list, and wherein determining the resource identifier comprises:

downloading the billing manifest file from the third-party network; and determining from the downloaded billing manifest file a resource-usage identifier associated with a resource-usage report for the particular third-party resource.

16. The method of claim 15, wherein, based on the resource identifier, carrying out download-streaming of the billing usage data associated with the particular third-party resource from the third-party network to the one or more server devices comprises:

opening a download-streaming connection from the third-party network for the resource-usage report for the particular third-party resource, and wherein the method comprises:

forgoing download-streaming any resource-usage reports associated with resource-usage identifiers included in any given downloaded billing manifest file upon first determining that the assembly identifier included in the any given downloaded manifest file matches that of a previously downloaded and processed billing manifest file.

17. The method of claim 13, comprising:

Monitoring a status of the download-streaming of the billing usage data;

transmitting status information indicative of the monitored status to a client computing device communicatively connected in or with the managed network, wherein the status information includes a percentage completion; and receiving one or more interactive commands from the client computing device to control the download-streaming, wherein the one or more interactive commands correspond to control actions, the control actions comprising abort download, pause download, or restart download, or a combination thereof.

* * * * *